United States Patent
Seguin

(10) Patent No.: US 9,485,981 B1
(45) Date of Patent: Nov. 8, 2016

(54) ROOT-PENETRATING NOZZLE FOR HERBICIDE APPLICATOR

(71) Applicant: Hubert Seguin, Chelmsford (CA)

(72) Inventor: Hubert Seguin, Chelmsford (CA)

(*) Notice: Subject to any disclaimer, the term of this patent is extended or adjusted under 35 U.S.C. 154(b) by 100 days.

(21) Appl. No.: 14/623,980

(22) Filed: Feb. 17, 2015

(51) Int. Cl.
*A01G 29/00* (2006.01)
*A01G 7/00* (2006.01)
*A01M 21/04* (2006.01)
*B05B 1/02* (2006.01)

(52) U.S. Cl.
CPC .............. *A01M 21/043* (2013.01); *B05B 1/02* (2013.01)

(58) Field of Classification Search
CPC ........... A01G 7/06; A01G 29/00; A01G 7/00
USPC .......................................................... 47/57.5
See application file for complete search history.

(56) References Cited

U.S. PATENT DOCUMENTS

| | | | |
|---|---|---|---|
| 1,747,494 A | 2/1930 | Sullivan | |
| 1,772,763 A | 8/1930 | Van Riper | |
| 1,861,254 A | 5/1932 | Arens | |
| 1,982,975 A * | 12/1934 | Aiken | B27K 3/105 427/291 |
| 2,206,053 A | 7/1940 | Schroeder | |
| 2,258,693 A * | 10/1941 | Van Yahres | A01G 17/18 122/233 |
| 2,334,556 A * | 11/1943 | Howard | A01G 23/14 47/57.5 |
| 2,874,658 A | 2/1959 | De Jarnette | |
| 2,885,121 A | 5/1959 | Lilleton | |
| 3,142,935 A * | 8/1964 | Campos | A01G 29/00 222/481 |
| 3,968,594 A * | 7/1976 | Kawakami | A01G 7/06 47/57.5 |
| 4,947,580 A | 8/1990 | Moore | |
| 5,239,773 A | 8/1993 | Doolittle, Jr. | |
| 5,443,641 A * | 8/1995 | Helsing | B27K 3/105 118/407 |
| 5,727,484 A | 3/1998 | Childs | |
| 8,418,400 B2 | 4/2013 | Wiese-Martin | |
| 8,677,684 B1 * | 3/2014 | Doolittle | A01G 7/06 47/57.5 |
| 2008/0209802 A1 * | 9/2008 | Williams | A01G 29/00 47/47 |

FOREIGN PATENT DOCUMENTS

| | | | | |
|---|---|---|---|---|
| CA | 2340587 A1 * | 9/2001 | ........... | A01G 27/006 |
| DE | 202014007931 U1 * | 10/2014 | ............. | A01G 29/00 |

* cited by examiner

*Primary Examiner* — Monica Williams
(74) *Attorney, Agent, or Firm* — Kyle A. Fletcher, Esq.

(57) ABSTRACT

The root penetrating nozzle for herbicide applicator is designed to penetrate and inject herbicide into the stem or root of a plant. The root penetrating nozzle for herbicide applicator comprises a penetrating tip that pierces the outer surface to penetrate the plant, an undulating tip that is used to deliver the herbicide, and a cap, coupling, and herbicide channel to connect the root penetrating nozzle for herbicide applicator to a source of herbicide.

12 Claims, 3 Drawing Sheets

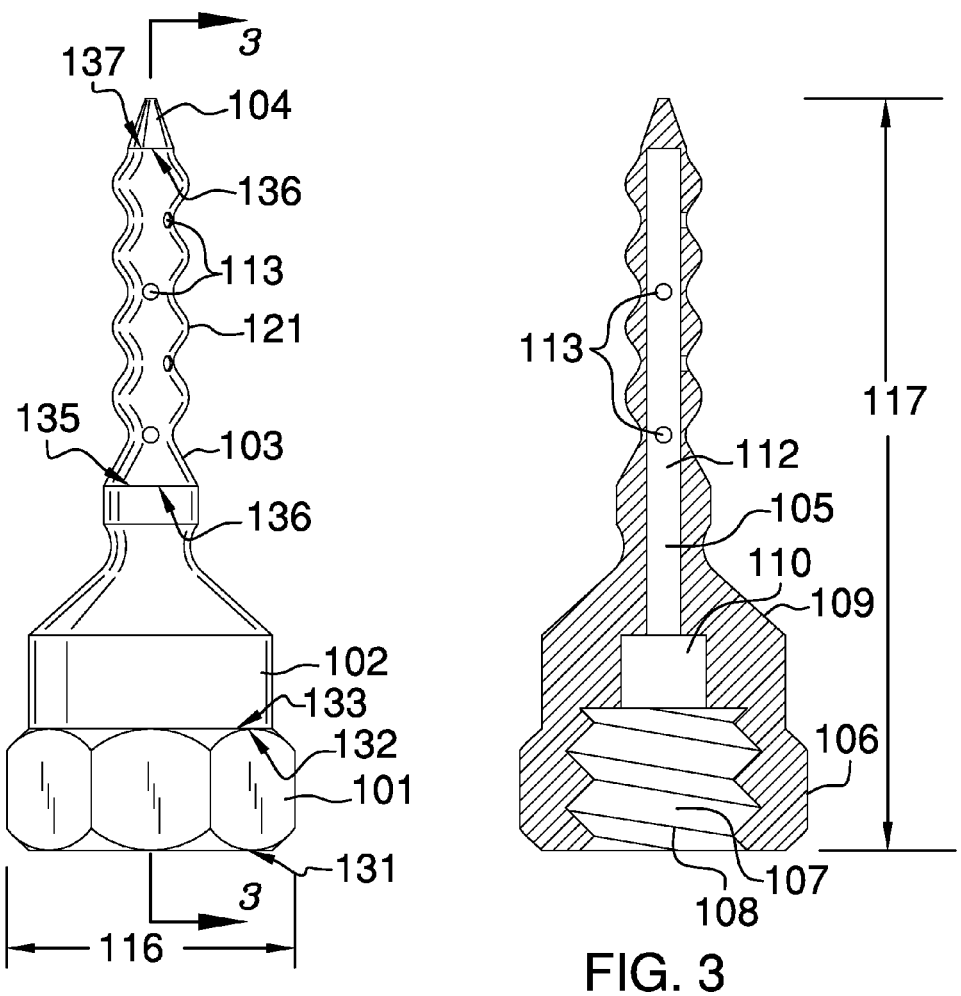
FIG. 2
FIG. 3
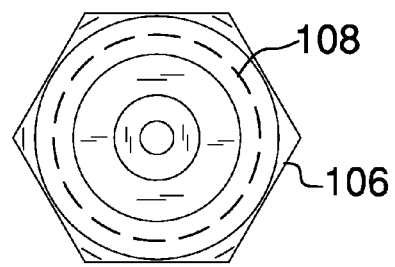
FIG. 4

ROOT-PENETRATING NOZZLE FOR HERBICIDE APPLICATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agricultural implements and applicators, more specifically, an application accessory configured for use with herbicides.

SUMMARY OF INVENTION

The root penetrating nozzle for herbicide applicator is designed to penetrate and inject herbicide into the stem or root of a plant. The root penetrating nozzle for herbicide applicator comprises a penetrating tip that pierces the outer surface to penetrate the plant, an undulating tip that is used to deliver the herbicide, and a cap, coupling, and herbicide channel to connect the root penetrating nozzle for herbicide applicator to a source of herbicide.

These together with additional objects, features and advantages of the root penetrating nozzle for herbicide applicator will be readily apparent to those of ordinary skill in the art upon reading the following detailed description of the presently preferred, but nonetheless illustrative, embodiments when taken in conjunction with the accompanying drawings.

In this respect, before explaining the current embodiments of the root penetrating nozzle for herbicide applicator in detail, it is to be understood that the root penetrating nozzle for herbicide applicator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the root penetrating nozzle for herbicide applicator.

It is therefore important that the claims be regarded as including such equivalent construction insofar as they do not depart from the spirit and scope of the root penetrating nozzle for herbicide applicator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an embodiment of the disclosure.

FIG. 3 is a cross-sectional view of an embodiment of the disclosure across line 3-3 in FIG. 2.

FIG. 4 is a bottom view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
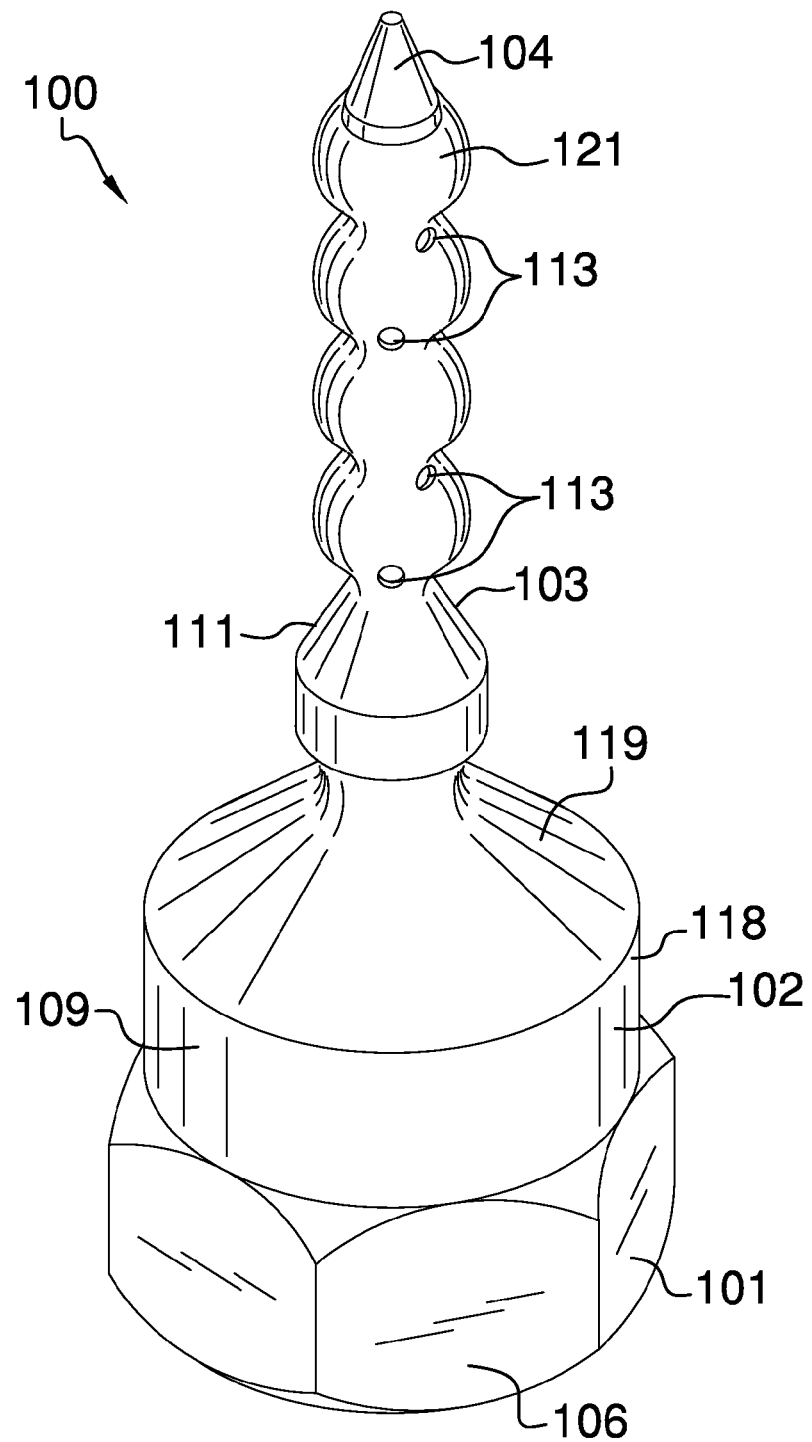
FIG. 1 is a perspective view of an embodiment of the disclosure.
Figure 5:
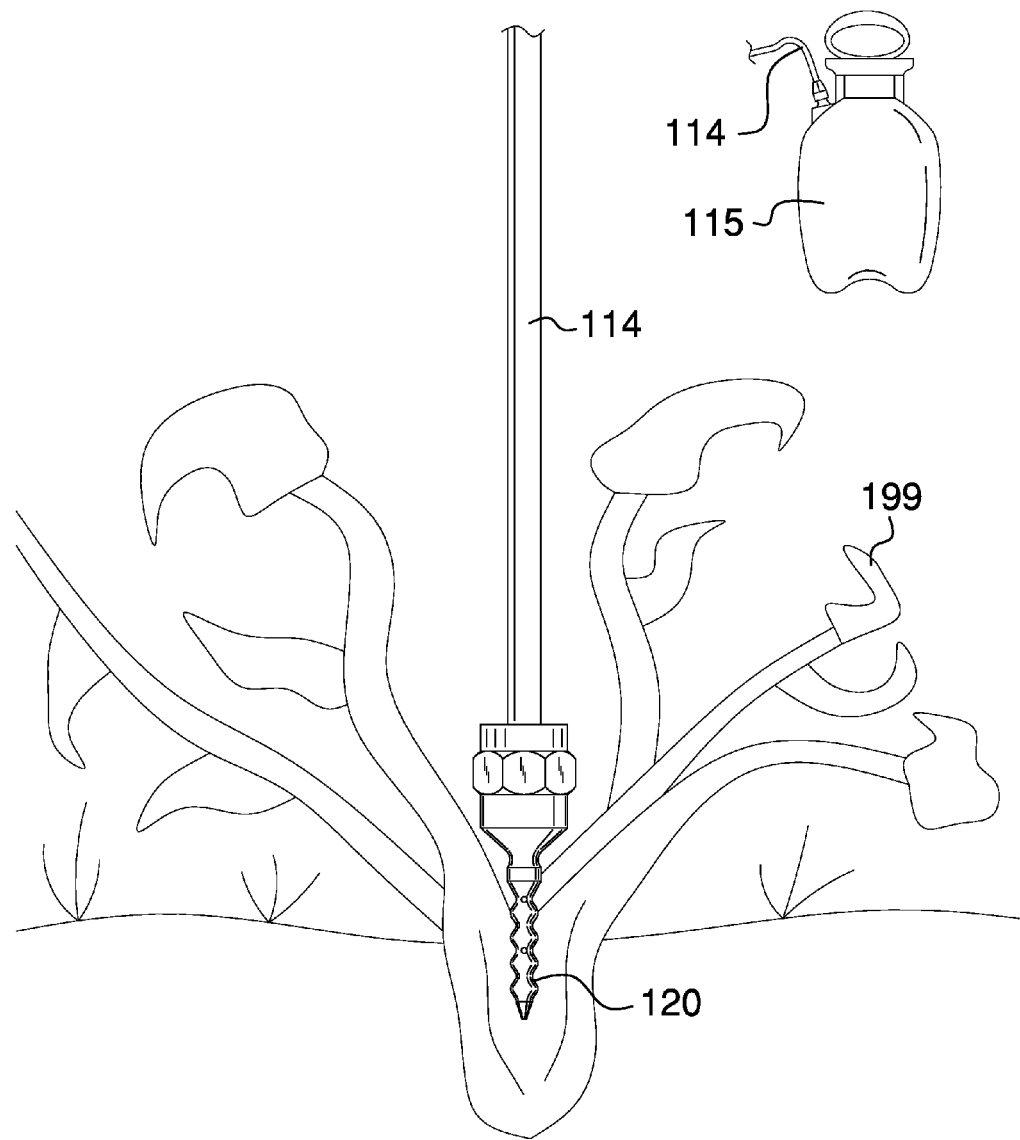
FIG. 5 is an in-use view of an embodiment of the disclosure.

Detailed reference will now be made to a first potential embodiment of the disclosure, which is illustrated in FIGS. 1 through 5. The root penetrating nozzle for herbicide applicator 100 (hereinafter invention) comprises a coupling 101, a cap 102, an undulating tip 103, a penetrating tip 104 and an herbicide channel 105.

The purpose of the coupling 101 is to fasten the invention 100 to the source of the herbicide. The coupling 101 comprises a coupling shell 106, a coupling interior channel 107 and a coupling interior screw thread 108. The coupling 101 is further defied with a first end 131 and a second end 132. The coupling shell 106 is in the shape of a hexagonal block. The coupling interior channel 107 is a hole formed through the center of the coupling 101 to allow for the passage of herbicide through the coupling 101. A coupling interior screw thread 108 is formed on the surface of the coupling channel 107. The coupling interior screw thread 108 is adapted to screw the invention 100 onto the hose 114 of an herbicide sprayer 115.

The purpose of the cap 102 is to act as an intermediate structure that reduces the diameter 116 of the invention 100 from the coupling 101 to the undulating tip 103. The cap 102 comprises a cap shell 109 and a cap interior channel 110. The cap 102 is further defined with a third end 133 and a fourth end 134. The third end 133 of the cap 102 is attached to the second end 132 of the coupling 101. The cap shell 109 is in the shape of a cylinder 118 with a cone shape 119 on one end. The tip end of the cone shape 119 is the fourth end 134 of the cap 102. The cap interior channel 110 is a hole formed through the center of the cap 102 to allow for the passage of herbicide through the cap 102.

The purpose of the undulating tip 103 is to drive the invention 100 into the root or stem 120 of the plant 199 and deliver the herbicide. The undulating tip 103 has an undulating exterior surface 121 that is adapted to be inserted into a root or stem 120 of a plant 199. Moreover, the undulating tip 103 increases a surface area of the plant 199 accessible to the herbicide. As a side note, the term plant 199 is being used to refer to weeds, and more specifically, an dandelion weed.

The undulating tip 103 comprises an undulating shell 111, an undulating interior channel 112 and a plurality of holes 113. The undulating tip 103 is further defined with a fifth end 135 and a sixth end 136. The undulating shell 111 forms the undulating exterior surface 121 of the undulating tip 103. The undulating interior channel 112 is a hole formed into the undulating tip 103 that transports herbicide from the cap interior channel 109 to each of the plurality of holes 113. The purpose of the plurality of holes 113 is to deliver the herbicide into the root or stem 120 of the plant 199. Each of the plurality of holes 113 is a hole that is formed in the undulating shell 111. Each of the plurality of holes 113 has an interior end 141 and an exterior end 142. The interior end 141 is joined to the undulating interior channel 112 such that herbicide can flow from the undulating interior channel 112 into each of the plurality of holes 113. The exterior end 142 is formed through the undulating exterior surface 121 and acts as a port that allows the herbicide to enter the root or stem 120 of the plant 199. The fifth end 135 of the undulating tip 103 is joined to the fourth end 134 of the cap 102.

The purpose of the penetrating tip 104 is to act as a sharp point to initially penetrate the root or stem 120 of the plant 199. The penetrating tip 104 is in the shape of a cone and has a sharp tip to facilitate the entry of the invention into the root or stem 120 of the plant 199. The penetrating tip 104 is further defined with a seventh end 137 and an eighth end 138. The seventh end 137 is attached to the sixth end 136 of the undulating tip. The eighth end 138 is the end distal to the seventh end 137.

The herbicide channel 105 is defined and formed by the alignment of the coupling interior channel 107, the cap interior channel 110 and the undulating interior channel 112 into a single cavity formed in the invention 100.

To use the invention 100, the sprayer component of an herbicide sprayer 115 is removed from the hose 114 of the herbicide sprayer 115. The invention 100 is attached to the hose 114 of the herbicide sprayer 115 by screwing the exterior screw thread attachment of the hose into the coupling interior screw thread 108. The penetrating tip 104 is then inserted into the root or stem 120 of the plant 199. The root is preferable. Once the penetrating tip has breached the root or stem 120 of the plant 199, the undulating tip 103 is inserted into the root or stem 120 of the plant 199. Once the undulating tip 103 is inserted, the herbicide sprayer is brought to pressure which forces herbicide into the herbicide channel 105, including the undulating interior channel 112, and into the root or stem 120 of the plant 199 through the plurality of holes 113.

The invention can be cast as a single unit or formed from multiple components. The invention is made of metal. Suitable metals include, but are not limited to, aluminum, stainless steel or a copper alloy.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A nozzle comprising:
   a coupling, a cap, an undulating tip, a penetrating tip and an herbicide channel;
   wherein the nozzle is adapted for use in applying herbicide;
   wherein the coupling is fitted with an interior screw thread;
   wherein the nozzle is adapted for use with a herbicide source;
   wherein a portion of the exterior surface of the nozzle is in the shape of an undulating pattern, and which is adapted to be inserted into a root or stem of a plant in order to deliver said herbicide directly into said plant;
   wherein the coupling fastens to the source of the herbicide;
   wherein the coupling comprises a coupling shell, a coupling interior channel and a coupling interior screw thread;
   wherein the coupling is further defined with a first end and a second end;
   wherein the coupling shell is in the shape of a hexagonal block;
   wherein the coupling interior channel is a hole formed through the center of the undulating tip; wherein the coupling interior screw thread is formed on the surface of the coupling channel;
   wherein the coupling interior screw thread is adapted to screw the nozzle onto the hose of an herbicide sprayer;
   wherein the cap acts as an intermediate structure that reduces the diameter of the nozzle from the coupling to the undulating tip;
   wherein the cap comprises a cap shell and a cap interior channel; wherein the cap is further defined with a third end and a fourth end; wherein the cap shell is in the shape of a cylinder with a cone shape on one end.

2. The nozzle according to claim 1 wherein the third end of the cap is attached to the second end of the coupling.

3. The nozzle according to claim 2 wherein the undulating tip comprises an undulating shell, an undulating interior channel and a plurality of holes;
   wherein the undulating tip is further defined with a fifth end and a sixth end;
   wherein the undulating shell forms the undulating exterior surface of the undulating tip;
   wherein the undulating interior channel is a hole formed into the undulating tip;
   wherein the fifth end of the undulating tip is attached to the fourth end of the cap.

4. The nozzle according to claim 3 wherein the shape of the undulating shell is formed in an undulating pattern.

5. The nozzle according to claim 4 wherein the herbicide channel is defined and formed by the alignment of the coupling interior channel, the cap interior channel and the undulating interior channel into a cavity.

6. The nozzle according to claim 5 wherein herbicide is transported through the herbicide channel from the coupling channel to the undulating interior channel.

7. The nozzle according to claim 6 wherein each of the plurality of holes is a hole that is formed in the undulating shell;
   wherein each of the plurality of holes has an interior end and an exterior end;
   wherein the interior end of each of the plurality of holes is joined to the undulating interior channel such that herbicide can flow from the undulating interior channel into each of the plurality of holes;
   wherein the exterior end of each of the plurality of holes is formed through the undulating exterior surface such that it acts as a port that allows the herbicide to enter the plant.

8. The nozzle according to claim 7 wherein the penetrating tip is in the shape of a cone;
   wherein the penetrating tip has a sharp tip;
   wherein the penetrating tip is further defined with a seventh end;
   wherein the seventh end is attached to the sixth end of the undulating tip.

9. A nozzle comprising:
   a coupling, a cap, an undulating tip, a penetrating tip and an herbicide channel;
   wherein the nozzle is adapted for use in applying herbicide;
   wherein the nozzle is adapted for use with a herbicide source;
   wherein a portion of the exterior surface of the nozzle is in an undulating tip;
   wherein the undulating tip is formed with a plurality of holes;
   wherein each of the plurality of holes has an interior end and an exterior end;
   wherein the interior end of each of the plurality of holes is joined to the herbicide channel; wherein the exterior end of each of the plurality of holes is formed through the surface of the undulating tip;
   wherein the coupling fastens to the source of the herbicide;
   wherein the coupling comprises a coupling shell, a coupling interior channel and a coupling interior screw thread;
   wherein the coupling is further defined with a first end and a second end;
   wherein the coupling interior channel is a hole formed through the center of the undulating tip; wherein the coupling interior screw thread is formed on the surface of the coupling channel;
   wherein the coupling interior screw thread is adapted to screw the nozzle onto the hose of an herbicide sprayer;
   wherein the cap acts as an intermediate structure that reduces the diameter of the nozzle from the coupling to the undulating tip.

10. The nozzle according to claim 9 wherein the penetrating tip and undulating tip are adapted to be inserted into a root or stem of a plant in order to deliver said herbicide directly inside of said plant.

11. The nozzle according to claim 10 wherein the herbicide source pumps herbicide through the herbicide channel and through the plurality of holes into the plant.

12. The nozzle according to claim 11 wherein the penetrating tip has a sharp cone end; wherein the penetrating tip is attached to the undulating tip.

* * * * *